Oct. 9, 1956

F. MARTINDELL 2,766,322

CODE TRANSLATOR DEVICE

Filed Aug. 20, 1953

4 Sheets-Sheet 1

INVENTOR
FRANK MARTINDELL
BY Emery Robinson
ATTORNEY

Oct. 9, 1956

F. MARTINDELL 2,766,322

CODE TRANSLATOR DEVICE

Filed Aug. 20, 1953

4 Sheets-Sheet 2

INVENTOR
FRANK MARTINDELL
BY Emery Robinson
ATTORNEY

Oct. 9, 1956 F. MARTINDELL 2,766,322

CODE TRANSLATOR DEVICE

Filed Aug. 20, 1953

4 Sheets-Sheet 3

INVENTOR
FRANK MARTINDELL

BY Emery Robinson
ATTORNEY

Oct. 9, 1956 F. MARTINDELL 2,766,322

CODE TRANSLATOR DEVICE

Filed Aug. 20, 1953

4 Sheets-Sheet 4

INVENTOR
FRANK MARTINDELL

BY Emery Robinson
ATTORNEY 2,766,322
Patented Oct. 9, 1956

2,766,322

CODE TRANSLATOR DEVICE

Frank Martindell, Millington, N. J., assignor, by mesne assignments, to Teletypesetter Corporation, Chicago, Ill., a corporation of Delaware Application August 20, 1953, Serial No. 375,402

6 Claims. (Cl. 178—33)

This invention relates to selecting apparatus and more particularly to code translating devices.

The primary object of the invention is to provide a selector arrangement for converting from a Baudot or permutation code system into a rectilinear coordinate code system.

Another object of the invention is to provide a rectilinear coordinate selector for adjusting a coordinately positionable instrumentality.

A further object of the invention is to provide in a rectilinear coordinate selector for adjustably positioning a coordinately positionable instrumentality, knee-action devices for smoothly accelerating and decelerating the movement of said instrumentality so that the latter comes to rest gently against a selected stop bar.

Briefly, the rectilinear coordinate selector according to the present invention comprises a set of code plates (six in the embodiment disclosed) which are set permutatively by a signal controlled device, said code plates being provided with code notch accommodations. Each of two corresponding groups of selectable bars threadedly related respectively to a group of slots, and are cooperable individually with said code notch accommodations to control a set of stop members, one set of stop members for each group. Cooperating with each set of said stop members and individual thereto are facilities adapted to control the directions of movement of a coordinately positionable instrumentality.

For a more comprehensive understanding of the present invention, reference may be had to the accompanying drawings and to the following detailed specification in which similar reference characters designate corresponding parts throughout, and in which, Fig. 1 is a front elevational view of the selector arrangement according to the present invention, with the type carrier removed;

Figs. 4 to 9, inclusive, are elevational views of the code plates according to the present invention.

Figure 1:
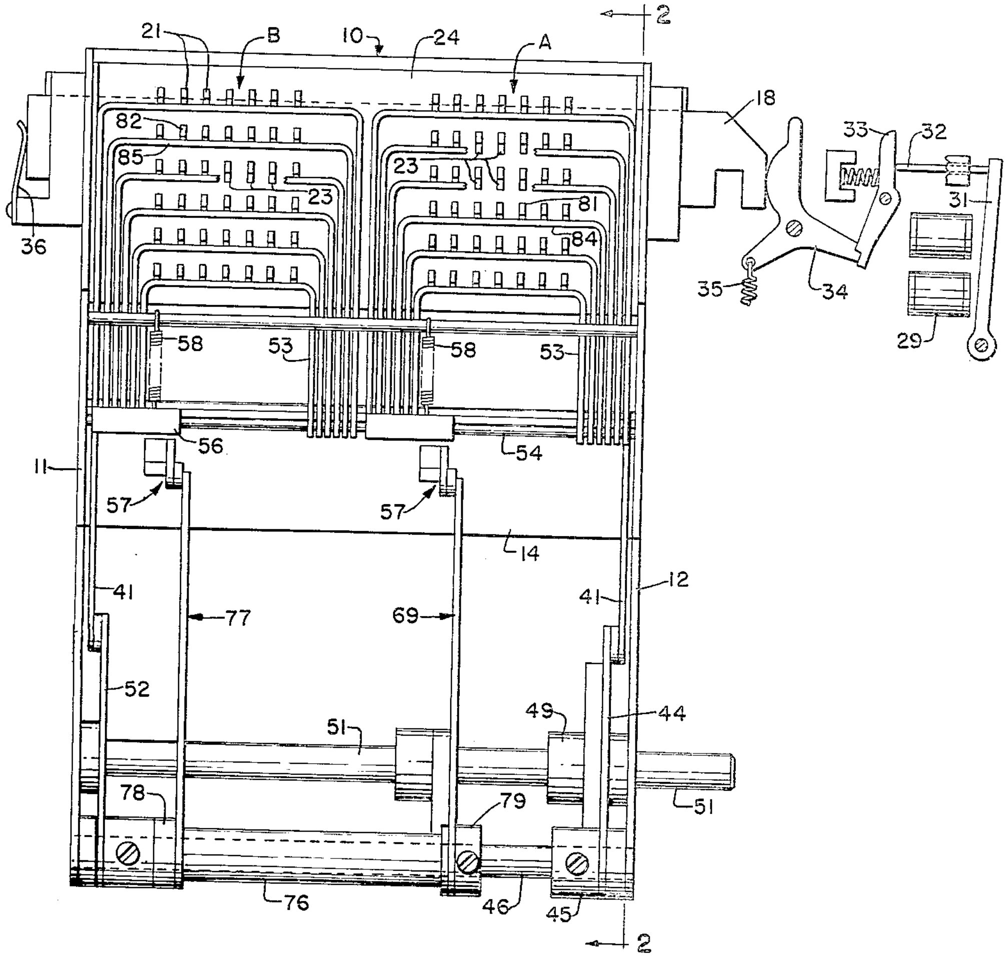
Figure 2:
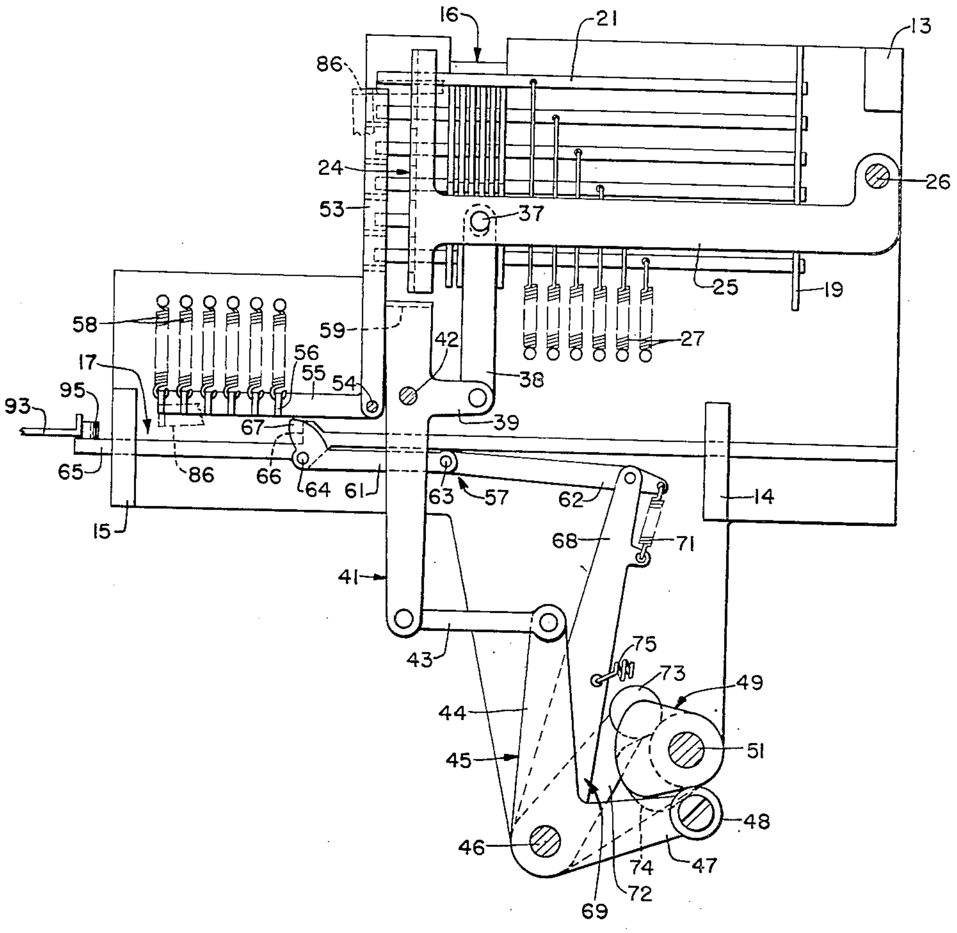
Fig. 2 is a sectional view of the selector arrangement taken on line 2—2 of Fig. 1.
Figure 3:
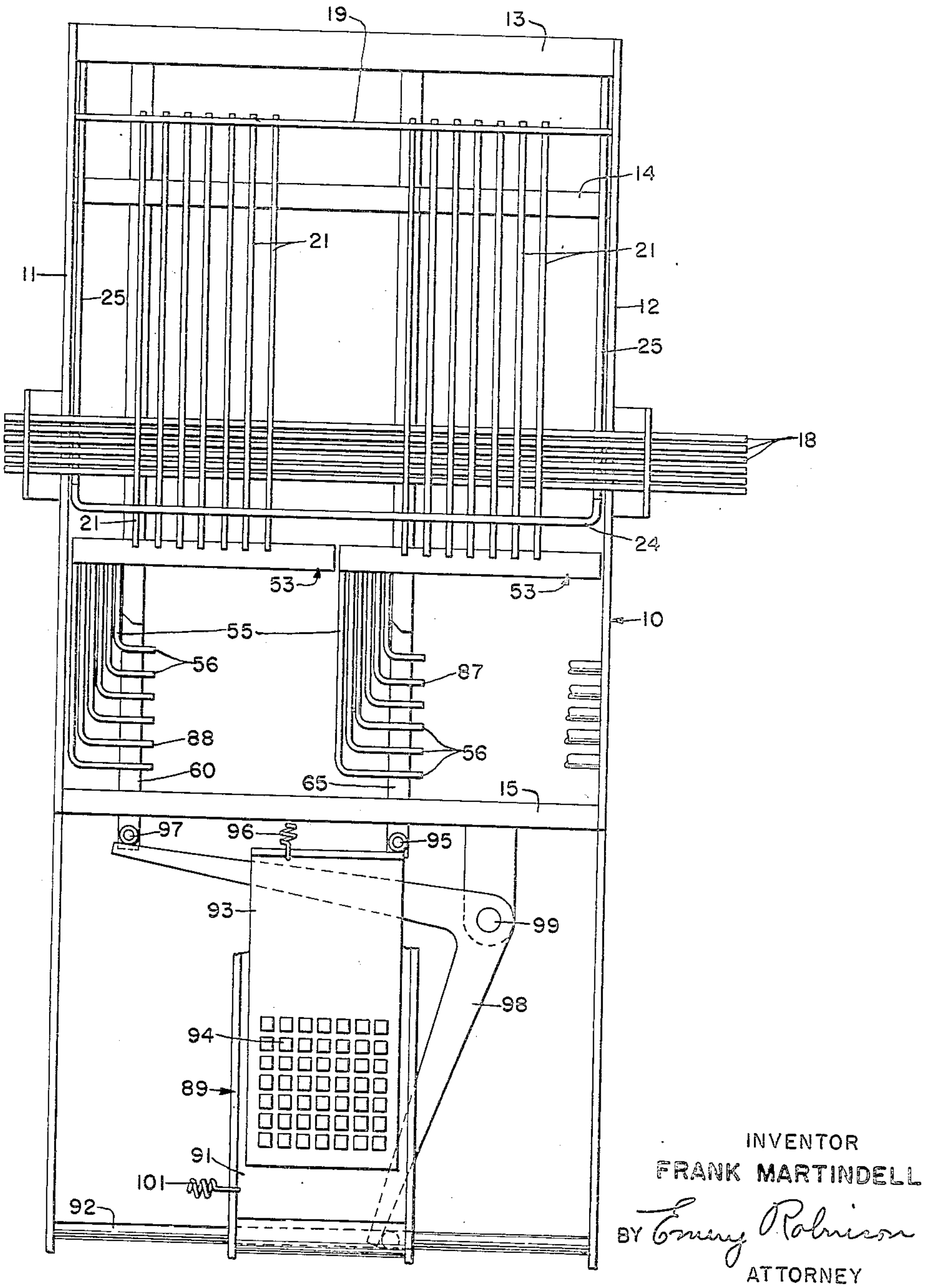
Fig. 3 is a top view of the selector arrangement shown in Figs. 1 and 2.
Figure 4:
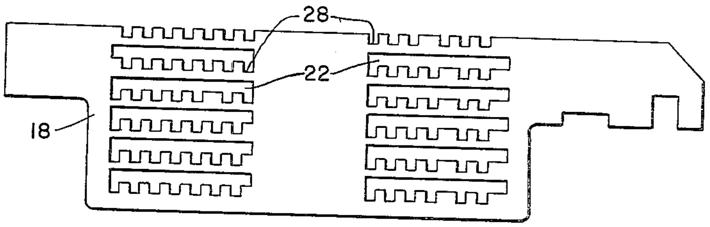
Figure 5:
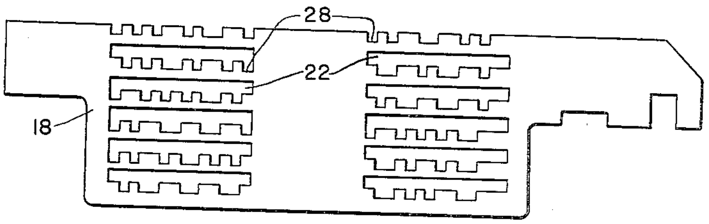
Figure 6:
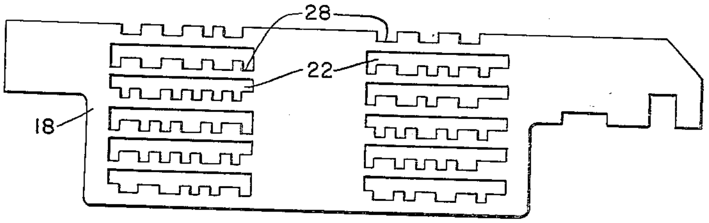
Figure 7:
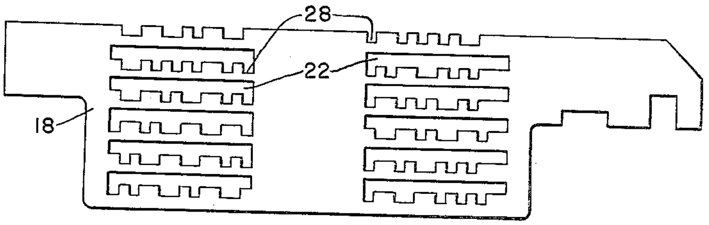
Figure 8:
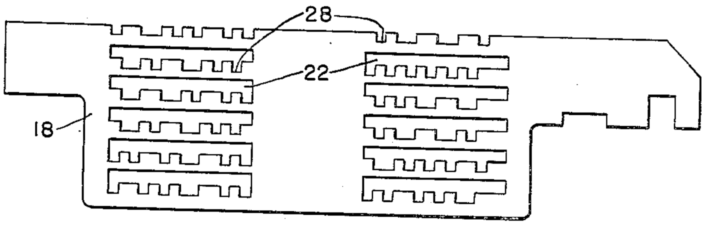
Figure 9:
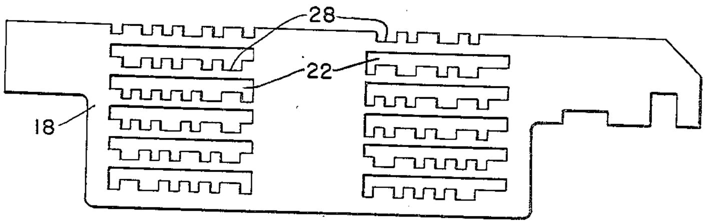

Having reference to Figs. 1, 2 and 3, the apparatus 10 according to the present embodiment of the invention comprises a framework consisting of side plates 11 and 12 secured to three cross-bars 13, 14 and 15. In said framework are supported in the upper section thereof the selector portion 16, in the middle portion thereof is supported the compensating device 17 and in the lower portion is located the driving means.

The selector mechanism comprises a set of six code plates 18 (in the present embodiment) having the conformation of the plates shown in Figs. 4 to 9. Supported between the side plates 11 and 12 at the rear of the apparatus is a cross plate 19 provided with a plurality of slots wherein are pivotally supported eighty-four sensing bars or selectable elements 21, arranged in two groups A and B of forty-two bars each. Each group or array A and B is arranged substantially in quadrature or square array, in six rows of seven bars each, which are threaded through openings 22 (Figs. 4 to 9) in the code plates 18, and pass through suitable openings 23 in a lift plate 24, said openings 23 being in alignment with the openings in cross plate 19. Lift plate 24 is provided on each side with an arm 25, through the instrumentality of which, the lift plate structure is mounted pivotally at 26—26 on the side plates 11 and 12.

The sensing bars or selectable elements 21 are biased downwardly by springs 27 individual thereto, so as to normally rest on the respective selecting facilities or coded edges 28 of the code plates 18. Cyclically, as will presently appear, the sensing bars 21 are raised by the lift plate 24 a sufficient distance to allow the code plates to be shifted in accordance with a succeeding selection. As illustrated in Fig. 1, the code plates 18 are selectably operated by a signal responsive selector mechanism of the form shown in Krum Patent No. 1,665,594. Briefly, the selector mechanism according to this patent is indicated schematically in Fig. 1 by a selector magnet 29, which is one of a set of selector magnets, the number of which depends upon the particular code used. For example, if a six unit code is used, six magnets 29 are employed, one for each impulse of the code. Associated with each magnet 29 is an armature 31 which controls a plunger member 32 which is adapted to operate a latch member 33. The latch member 33 when operated by the plunger 32 in a counterclockwise direction (as viewed in Fig. 1) upon the energization of magnet 31 in response to a code impulse, acts to trip a bell crank lever 34 which is actuated thereupon in a counterclockwise direction by its spring 35 to shift its associated code plate 18 leftwardly. Springs 35 are strong enough to overcome the return springs 36 associated with each code plate 18. The bell cranks 34 are restored to their clockwise or latched position in the manner disclosed in said Patent No. 1,665,594.

The lift plate 24 is connected at 37 to one end of a link 38, the other end of which is connected pivotally to an arm 39 of a bail 41, pivotally mounted on studs 42 secured to the side plates 11 and 12. The depending arm of bail 41 is connected to one end of a link 43, the other end of which is connected to the vertical arm 44 of a bell crank lever 45 mounted on a cross shaft 46. The horizontal arm 47 of the bell crank lever 45 carries a cam follower roller 48 adapted to cooperate with the periphery of a lift cam 49 carried on a cam shaft 51. Secured to the opposite end of cross shaft 46 is a lever arm 52 corresponding to arm 44 of lever 45 which is adapted, through a link similar to link 43 to cooperate with another depending arm of bail 41.

Cooperating with the extremities of the sensing bars 21 in each group A and B are a plurality of nested sensing bails 53 carried on a pivot shaft 54 mounted in the side frames 11 and 12. Each of the bails 53 is assigned to a horizontal row of bars 21. Each of the bails 53 is provided with an extension 55, each extension terminating in a laterally directed stop portion 56 adapted to cooperate with a knee-action device 57 (Fig. 2) of the form, shown in United States Patent No. 2,574,137, issued November 6, 1951, to W. J. Zenner. Two knee-action devices 57 are provided in the compensating device 17, one for each of two directions of motion. The bails 53 are normally biased clockwise (as viewed in Fig. 2) by individual springs 58 to bear against a web portion 59 of the bail member 41.

When any one of the stop flanges or lateral portions 56 of the bails 53 is presented in the path of the knee-action device 57, as will presently appear, the movements of the compensating device 17 are determined. Each of the knee-action devices 57 comprises links 61 and 62 pivoted together at 63. Link 61 is pivotally connected at 64 to a slide member 60 or 65 slidably supported in cross members 14 and 15. Slides 60 and 65 are each provided with a positive stop shoulder or abutment 66 adapted to coact with the selected stop flange 56. The link 61 is provided with an anticipator or buffer portion 67 also adapted to cooperate with the selected one of the selectable stop flanges 56. Link 62 is pivotally articulated to the upper end of arm 68 of an operating lever 69. A spring 71 normally tends to rotate the link 62 clockwise into the position shown in Fig. 2. Referring to Fig. 1, it will be observed that lever 69 is secured to a sleeve 76 carried freely on the cross shaft 46, and also fixed to the sleeve 76 at the opposite end thereof is a lever 77 comparable to lever 69 which is connected to a second knee-action device 57. An arm 72 also mounted on sleeve 76 carries a cam follower roller 73 adapted to ride on the periphery of a compensator cam 74. A spring 75 normally biases the lever clockwise (as viewed in Fig. 2) to maintain roller 73 in engagement with cam 74. Collars 78 and 79 hold the sleeve 76 appropriately in place.

In the operation of the selector mechanism according to the present invention, as exemplified by Figs. 1 to 3 of the drawings, the code plates 18 are selectively operated by any well known means, such as automatically under remote control in response to telegraph signals, or locally under the control of a perforated tape, as shown in Fig. 16 of United States Patent No. 2,091,286 issued to H. L. Krum et al. on August 31, 1937. Thus, in the embodiment shown, the code plates 18 are set permutably to select bars 21. According to the invention, one bar 21 will be selected in each of the groups A and B in response to each permutable setting of the code plates 18. For example, it is assumed that for a particular permutable setting of code plates 18, bar 81 of group A and bar 82 of group B will be selected (Fig. 1). Then, upon rotation of shaft 51 in proper timed relation with respect to the operation of the selector mechanism, as exemplified by said Patent No. 1,665,594, the cam 49 will impart clockwise rotation to lever 45 which, through link 43, imparts counterclockwise rotation to bail member 41 to, in turn, through link 38 cause lift member 24 to be actuated clockwise about pivot 26.

Member 24 lifts the bars 21 away from the coded edges of code plates 18 sufficiently to permit the plates 18 to be moved to a new permuted setting. The counterclockwise rotation of bail member 41 will, at the same time, through web 59 effect the counterclockwise movement of all of the bails 53 to bring the web portions thereof clear of the extremities of bars 21, so that when the lift member 24 is allowed to return to its lowered position a new bar 21 (or the same bar) will be selected. By virtue of the slotted holes in links 38 associated with pins 37, the bails 53 are withdrawn from the ends of bars 21 before the bars 21 are lifted away from the coded edges of code plates 18, and the bars 21 are returned again into engagement with said coded edges before the bails 53 are returned to their clockwise position.

In the specific example assumed, the bail 84 of group A (Fig. 1) will be blocked by the end of selected bar 81 from returning to its ultimate clockwise position. Likewise, the bail 85 of group B will be blocked by selected bar 82 from returning to its ultimate clockwise position, in the manner indicated by dotted line position 86 (Fig. 2). In the case of bail 84 its stop portion 87 will be presented into the path of the knee-action device 57 associated with group A, and in the case of bail 85 its stop portion 88 (Fig. 3) will be presented into the path of knee-action device 57 of group B. Then, when the knee-action devices 57 are actuated leftwardly (as viewed in Fig. 2) by their respective levers 69 and 77 under the control of cam 74 in proper timed relation to the operation of the elements controlled by cam 49, the bars 60 and 65 will have moved a distance determined by said stop portions 87 and 88. As disclosed in said Patent No. 2,574,137, the anticipator portion 67 first impinges against the stop portion 87 (or 88) and initiates a collapsing action in the links 61 and 62, which action causes a decelerating movement between the time of contact of said anticipator 67 and said abutting means 66 with the stop portion 87 (or 88).

The motions imparted to the bars 60 and 65 are utilized to govern the positionment of a type carrier 89 (Fig. 3), comprising a portion 91 slidable rightwardly and leftwardly (as viewed in Fig. 3) on guide members or tracks, indicated 92, and a portion 93 slidable backwardly and forwardly in appropriate guide means on portion 91. Thus, to position a character element 94 in predetermined operative position, the bar 65 functions, through stud 95, to move the portion 93 forwardly, against the pull of a spring 96, from a normal position to one selected coordinate position. Similarly, the bar 60 functions, through its stud 97, to rotate the bell crank 98 counterclockwise (as viewed in Fig. 3) about pivot 99 to move portion 91 rightwardly, against the pull of a spring 101, from a normal position to the other coordinate position.

It is to be understood that the above-described arrangement of the present invention is merely illustrative of the application of the principles thereof. Other arrangements may be readily devised by those skilled in the art which will embody the principles of the invention and fall within the spirit and scope thereof.

What is claimed is:

1. In combination, a movable member adapted to be coordinately positionable, a signal responsive means, a plurality of code plates selectively controlled by said signal responsive means, said code plates having selecting facilities arranged in two groups, one of said groups effective to control the movement of said movable member in a first coordinate direction and the other of said groups effective to control the movement of said movable member in a second coordinate direction, a plurality of groups of selectable elements, a plurality of sensing bails cooperably related to each group of selectable elements, said selectable elements effective to selectively control said sensing bails, stop instrumentalities on said sensing bails for determining the extent of movement of said movable member in said coordinate directions, said instrumentalities adapted to be selectively conditioned according to the selective positionment of said sensing bails, and a pair of knee-action means, each of said knee-action means adapted to impinge against said selectively conditioned instrumentalities in respective groups to effectuate the coordinate positionment of said movable member.

2. In combination, a member movable in two directions, a signal responsive means, a plurality of code plates selectively controlled by said signal responsive means, said code plates having selecting facilities arranged in two groups, one of said groups effective to control the movement of said movable member in a first direction and the other of said groups effective to control the movement of said movable member in a second direction, a plurality of selectable elements cooperably associated with each group of selecting facilities, a plurality of sensing bails cooperably related to each group of selectable elements, said selectable elements effective to selectively control said sensing bails, stop instrumentalities on said sensing bails for determining the extent of movement of said member in said directions, said instrumentalities adapted to be selectively conditioned according to the selective positionment of said sensing bails, and a pair of knee-action means, each of said knee-action means comprising anticipator means for impinging against said selectively conditioned instrumentalities, whereby the movement of said member is decelerated prior to arrestment of said member by said stop elements.

3. In combination, a member movable in two directions, a set of signal sensitive elements, a corresponding set of code plates, means to position said code plates in accordance with the action of said corresponding signal sensitive elements, said code plates having selecting facilities arranged in two groups, one of said groups effective to control the movement of said movable member in a first direction and the other of said groups effective to control the movement of said movable member in a second direction, a plurality of elements cooperably associated with each group of selecting facilities, a plurality of nested bails cooperably related with each group of elements, said elements effective to selectively control said sensing bails, each bail provided with a stop instrumentality, said instrumentalities adapted to be selectively conditioned according to the selective positionment of said sensing bails, and a pair of knee-action means, each of said knee-action means comprising anticipator means for impinging against said selectively conditioned stop instrumentalities, whereby the movement of said member is decelerated prior to arrestment of said member by said stop instrumentalities.

4. In combination, a movable member adapted to be coordinately positionable, a signal responsive means, a plurality of codedly apertured plates selectively controlled by said signal responsive means, said apertures arranged in two groups, one of said groups effective to control the movement of said movable member in a first coordinate direction and the other of said groups effective to control the movement of said movable member in a second coordinate direction, two groups of selectable elements, each group arranged substantially in quadrature and threadedly related to a respective group of apertures, a plurality of sensing bails cooperably related to each group of elements, each of said elements adapted selectively to have a blocking or a non-blocking relationship with certain ones of said bails, stop instrumentalities on said bails for determining the extent of movement of said movable member in said coordinate directions, and a pair of knee action means, each of said knee-action means adapted to impinge against said selectively conditioned instrumentalities in respective groups to effectuate the coordiate positionment of said movable member.

5. In combination, a movable member adapted to be coordinately positionable, a signal responsive means, a plurality of codedly apertured plates selectively controlled by said signal responsive means, said apertures arranged in two groups, one of said groups effective to control the movement of said movable member in a first coordinate direction and the other of said groups effective to control the movement of said movable member in a second coordinate direction, two groups of selectable elements, each group arranged substantially in quadrature and threadedly related to a respective group of apertures, a plurality of nested sensing bails cooperably related to each group of elements, each of said elements adapted selectively to have a blocking or a non-blocking relationship with certain ones of said bails, stop instrumentalities on said bails for determining the extent of movement of said movable member in said coordinate directions, and a pair of knee-action means, each of said knee-action means adapted to impinge against said selectively conditioned instrumentalities in respective groups to effectuate the coordinate positionment of said movable member.

6. In combination, a movable member adapted to be coordinately positionable, a signal responsive means, a plurality of codedly apertured plates selectively controlled by said signal responsive means, said apertures arranged in two groups, one of said groups effective to control the movement of said movable member in a first coordinate direction and the other of said groups effective to control the movement of said movable member in a second coordinate direction, two groups of selectable elements, each group arranged substantially in quadrature and threadedly related to a respective group of apertures, a plurality of sensing bails effective under certain predetermined selective conditions to have end-on-engagement with said selectable elements, stop instrumentalities on said bails for determining the extent of movement of said movable member in said coordinate directions, and a pair of knee-action means, each of said knee-action means adapted to impinge against said selectively conditioned instrumentalities in respective groups to effectuate the coordinate positionment of said movable member.

References Cited in the file of this patent

UNITED STATES PATENTS

| | | |
|---|---|---|
| 2,505,729 | Zenner | Apr. 25, 1950 |
| 2,574,102 | Gubisch | Nov. 6, 1951 |